Patented Nov. 2, 1926.

1,605,419

UNITED STATES PATENT OFFICE.

GÉZA ZEMPLÉN, OF BUDAPEST, HUNGARY, ASSIGNOR TO CHEMISCHE FABRIK DR. HUGO STALTZENBERG, OF HAMBURG, GERMANY.

PROCESS FOR THE MANUFACTURE OF TARTARIC ACID.

No Drawing. Application filed December 11, 1924, Serial No. 755,323, and in Germany November 5, 1924.

The preparation of tartaric acid from fumaric acid or maleic acid by indirect methods has been repeatedly described in scientific investigations. However, owing to the difficulties of such a process and the small yields obtained the process has not been introduced into the practice. Now, where the preparation of fumeric acid has become economical, I attempted to investigate the question, whether the fumaric acid could not be made useful for the preparation of tartaric acid on a large scale. I found that such could be realized by using a process that forms the object of the present invention.

An aqueous suspension of fumaric acid is neutralized by the salt of a weak acid of an alkali or an alkaline earth, for instance, by an alkaline carbonate. The solution is then saturated with a halogen, say with chlorine or bromine, and afterwards boiled for some time in the presence of alkaline carbonates in a vessel provided with a reflux cooler. The same result is attained, if at first during the halogenation only a small quantity of carbonate be added along with some metallic catalyst, say copper-bronze and the product of reaction obtained be heated under carbonic acid pressure in an autoclave at 100° C.

The process described gives very good yields, which are a great deal higher than those ever attained in the scientific experiments described in chemical text-books. Instead of fumaric acid one may use maleic acid with the same good result.

Example 1.

1,17 kilos of fumaric acid are suspended in 30 litres of water. 2 kilos of calcium carbonate are added and the mixture is heated stirring all the while at 50° C. I then add 1,7 kilos of bromine very gradually, drop by drop and finally heat the mixture of reaction for about one hour in a vessel with a reflux cooler. Thus I obtain the calcium salt of tartaric acid with a very good yield.

Example 2.

2,34 kilos of fumaric acid are suspended in 25 litres of water and neutralized with calcium carbonate. The mass is cooled down to 2° C. It is then saturated with gaseous chlorine. I then add 1,4 kilos of calcium carbonate and boil for 2 hours. The solution produced is calcium tartrate and the yield is a very good one.

Example 3.

220 grammes of fumaric acid are halogenated, as described in examples 1 and 2. The intermediary product is separated and placed in 8 litres of water along with 750 grammes of sodium bicarbonate and 5 grammes of bronze in an autoclave, whereupon the mass is saturated with carbonic acid at 20 atmospheres. The autoclave is then closed and heated to 100° C. for about 1½ hours. The result is a solution of sodium tartrate and the yield is nearly theoretical. Instead of starting from the free fumaric or maleic acid, I can also use the salts of those acids and may halogenate them in the presence of carbonates or bicarbonates. The halogenated product without being separated is then heated by itself for some time or in an autoclave under carbonic acid pressure with or without the presence of a metallic catalyst.

What I claim is:—

1. A process for the manufacture of tartrates from di-carboxy-ethylenes, consisting in neutralizing the acid, halogenating the mass and warming the halogenated product in the presence of salts formed by carbonic acid, essentially as described.

2. A process for the manufacture of tartrates from di-carboxy-ethylenes, consisting in neutralizing the acid, halogenating the mass, adding some bicarbonate, placing the mixture in an autoclave under carbonic acid pressure and heating it under that pressure, essentially as described.

3. A process for the manufacture of tartrates from di-carboxy-ethylenes, consisting in neutralizing the acid, halogenating the mass adding some bicarbonate, placing the mixture in an autoclave under carbonic acid pressure, adding some metallic catalyst, say bronze, and finally heating it under that pressure, essentially as described.

4. A process for the manufacture of tartrates from di-carboxy-ethylenes, consisting in halogenating the said acids in the presence of salts formed by carbonic acid and treating the halogenated intermediate product without previous separation in the same manner as described.

In testimony whereof I have signed by name to this specification.

GÉZA ZEMPLÉN.